United States Patent [19]

Siwek

[11] Patent Number: 4,993,123
[45] Date of Patent: Feb. 19, 1991

[54] ADJUSTABLE NAUTICAL ROPE LOCK

[76] Inventor: Thomas J. Siwek, 1945 Hampton Dr., Wheaton, Ill. 60187

[21] Appl. No.: 534,731

[22] Filed: Jun. 7, 1990

[51] Int. Cl.⁵ ............................................. F16G 11/00
[52] U.S. Cl. ................................ 24/136 R; 24/136 K; 403/211
[58] Field of Search ............. 24/136 R, 136 K, 136 L, 24/129 R, 503; 403/211

[56] References Cited

U.S. PATENT DOCUMENTS

| | | |
|---|---|---|
| D. 248,367 | 7/1978 | Haft . |
| D. 257,554 | 11/1980 | Haft . |
| 2,220,203 | 11/1940 | Branin ............................ 24/136 R |
| 3,811,155 | 5/1974 | Stafford ......................... 24/136 R |
| 4,217,847 | 8/1980 | McCloud . |
| 4,250,734 | 1/1981 | Tinsley . |
| 4,278,042 | 7/1981 | Lindquist . |
| 4,602,891 | 7/1986 | McBride ......................... 403/211 |
| 4,611,779 | 9/1986 | Leonard, Jr. . |
| 4,614,007 | 9/1986 | Else ................................ 24/136 R |
| 4,620,499 | 11/1986 | Slemmons . |
| 4,660,493 | 4/1987 | Lowry, III . |
| 4,785,509 | 11/1988 | Fisher ............................ 24/129 R |
| 4,843,994 | 7/1989 | Wilson . |
| 4,873,934 | 10/1989 | Renault . |

Primary Examiner—Victor N. Sakran
Attorney, Agent, or Firm—Lee, Mann, Smith, McWilliams & Sweeney

[57] ABSTRACT

A two part rope lock for hooking over the railing of a boat, having a hanger member with a pair of transversely arranged guide hooks at upper and lower ends. A channel is formed by two outstanding flanges at the back of a leg of a rail-engageable hook between the guide hooks for passage of a rope therethrough. The flanges include inclined slots for the slidable non-pivotal attachment of a cam wedge second member that moves at an inclined angle toward the leg of the hanger member. Both the hanger member and the cam wedge member include serrated surfaces so that when the cam wedge is slid downwardly a rope may be clamped therebetween. The rope lock is adjustable by one hand so that the rope may be adjusted to be gripped at different positions, such as for use with a bumper guard attached to a depending end of the rope for placing the guard at different locations on the hull of a boat as needed.

21 Claims, 2 Drawing Sheets

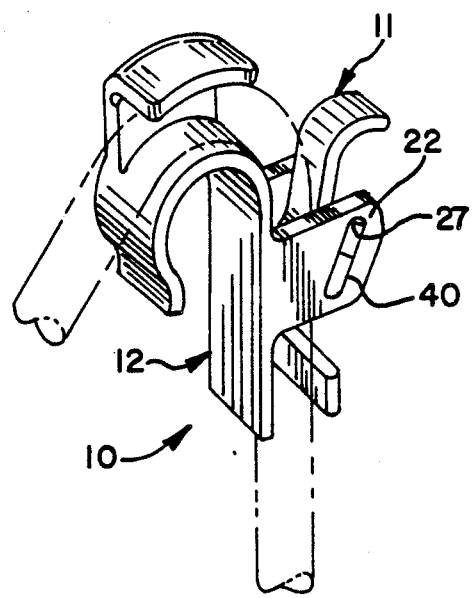
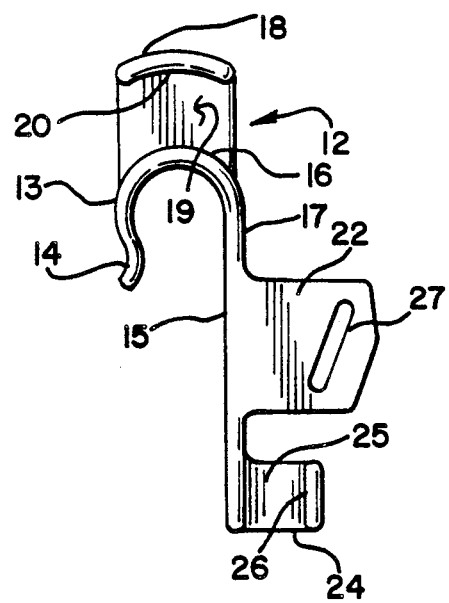
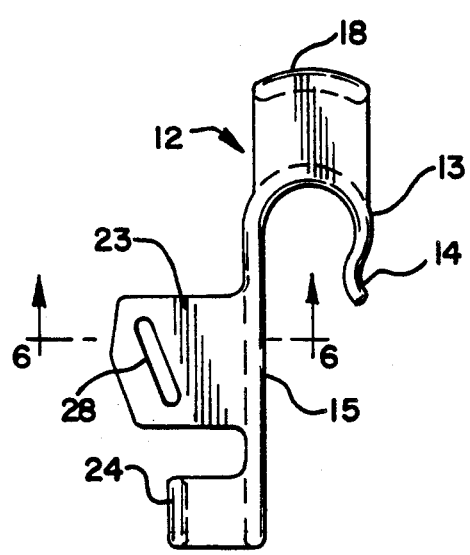
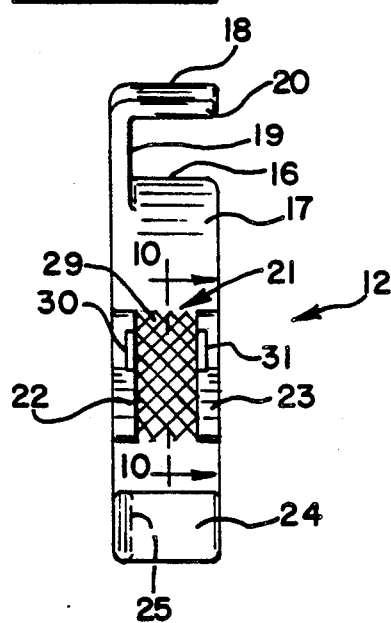
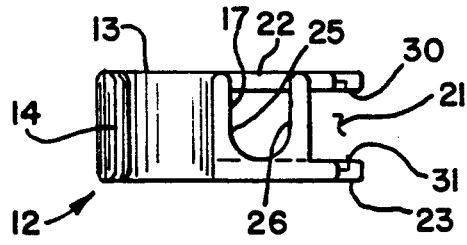
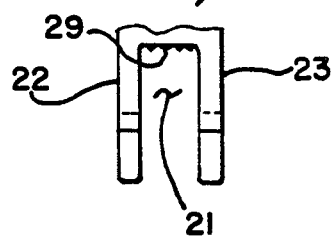

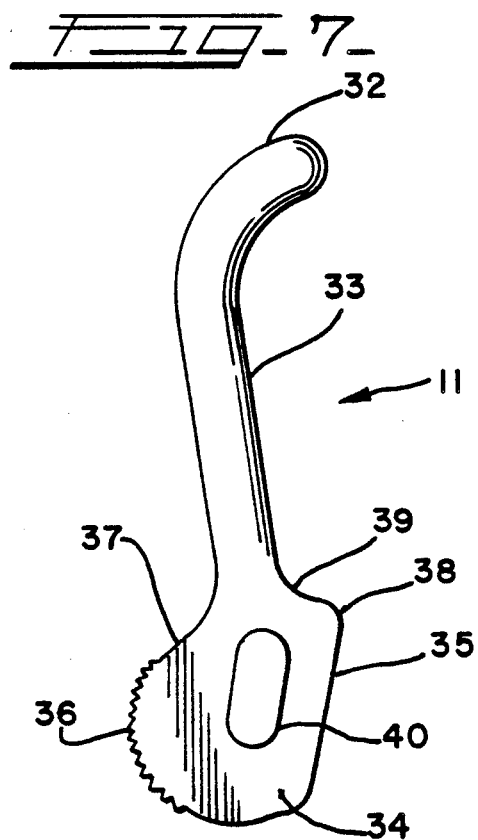
FIG_7_
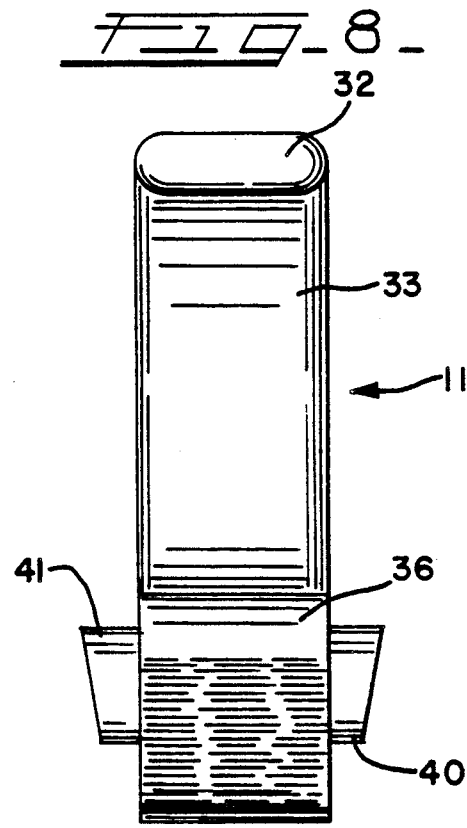
FIG_8_
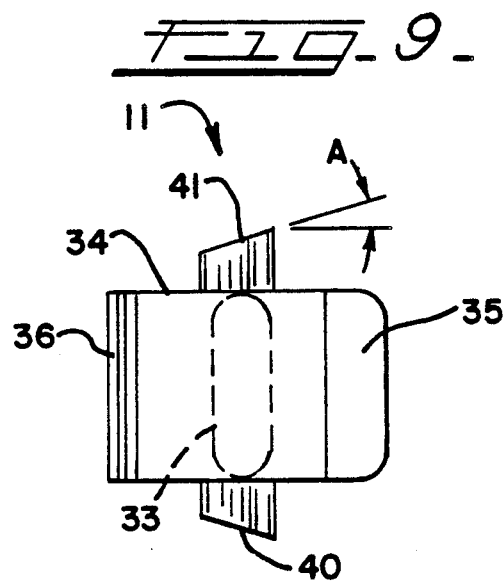
FIG_9_
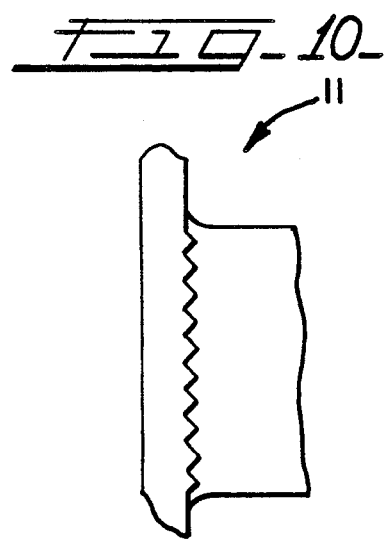
FIG_10_

ADJUSTABLE NAUTICAL ROPE LOCK

BACKGROUND OF THE INVENTION

The invention generally relates to adjustably holding nautical lines used for sail and motor boats. The invention is more specifically directed toward an adjustable lock for nautical ropes used to hold bumper guards along the outside of the hull. Even more particularly the invention is directed toward a lock that may be adjusted by one hand for lowering or raising the position of a boat bumper guard.

The easy adjustment of ropes and lines for use in pleasure craft is always desirable because numerous nautical chores are typically required to prevent boat damage, and ensure safe sailing and cruising.

Usually the adjustment of ropes and lines is achieved by engaging the rope with a cleat, typically of the cam-type. Often, at least one pivoting member is used to bias the rope against a serrated portion to lock the line in place. Other more rudimentary procedures simply involve coiling or knotting a line about a holder bracket, railing, deck cleat, and the like.

Different type hanger brackets and holders have been used in connection with securing the rope attached to bumper guards that are used to protect the hull of the boat from harmful contact with a dock, pier or wherever the craft might be tied up.

No prior art brackets or holders have been provided which allow for a detachable engagement to the railing of a boat and with the capability of adjusting the rope with one hand. Further, brackets and holders of previous configurations have most frequently used a standard cam-type cleat locking apparatus requiring at least one pivoting member for biasing the rope to another member.

It is a primary goal of the invention to provide a durable adjustable lock, preferably for use in adjusting nautical ropes for boat bumper guards, which may be hooked over a boat railing and manually adjusted with one hand.

It is a further goal of the invention to provide a slide cam member movable within a hooked hanger member requiring no pivoting action and operable with only a simple sliding motion to close a pass-through channel for clamping a nautical line.

It is another objective of the invention to provide an adjustable nautical line lock formed of two molded hard plastic components which are weather resistant, detachably movable for different positioning on a boat, and which avoid scratching or abrading a boat rail.

SUMMARY OF THE INvENTION

The invention comprises an adjustable nautical rope lock that includes a first hanger member having three hooks, two of which serve as guides for a nautical line and the other for attachment to a boat railing and the like. The guide hooks are at the top and bottom of the hanger bracket and intermediately there is located a pair of outward standout flanges extending from a long leg of the rail engaging hook. The standout flanges include a pair of opposing slots that are inclined to converge toward the back leg of the rail engaging hook and wherein the backside of the leg of the engaging hook includes a patterned relief surface for frictional engagement with a rope. A slide cam second member is provided with a pair of outstanding tabs, slide engageable with the slots of the standout flanges, for movement therein. The cam member further includes a protruding and serrated portion to cooperate with the patterned relief surface of the first member to frictionally engage a rope or line wedged therebetween. The slide cam member further including an upper looped end for manual engagement by the user's hand to slide the cam member upward or downward. The nautical line is fed from the top guide hook downward between the standout flanges, thence through the bottom guide hook and thereafter ending at a dependent boat bumper guard or the like, which weight urges the serrated surface of the cam member against the rope. The guide hooks for the rope are outwardly concave generally in the horizontal direction and the rail engaging hook is concave and downwardly open whereby to be capable of being hooked over a railing. All three hooks preferably have curved inner ropeguiding surfaces.

BRIEF DESCRIPTION OF THE DRAWINGS

FIG. 1 is a perspective view looking downwardly at the assembled adjustable nautical rope lock of the invention and showing a slide cam member engaged to a hooked hanger member;

FIG. 2 is a side elevational view of the hooked hanger member;

FIG. 3 is a side elevational view of the hooked hanger member from side opposite that shown in FIG. 2;

FIG. 4 is a rear elevational view of the hooked hanger member and showing a channel for the locking engagement of a nautical rope or the like;

FIG. 5 is a bottom view of the hooked hanger member;

FIG. 6 is a horizontal sectional view taken along line 6—6 in FIG. 3 in the direction of the arrows;

FIG. 7 is a side view of the slide cam member;

FIG. 8 is a front view of the slide cam member and showing the serrated engageable portion for locking a nautical rope or the like against the hooked hanger member;

FIG. 9 is a bottom view of the slide cam member; and,

FIG. 10 is a partial cross sectional view of the hooked hanger member taken along the line 10—10 of FIG. 4 looking in the direction of the arrows at a larger scale.

DETAILED DESCRIPTION OF THE INVENTION

With reference first to FIG. 1, a perspective view is provided showing an adjustable nautical rope lock 10 in accordance with the invention. In phantom lines, a rope, such as for tethering a depending bumper guard along the hull of a boat, is shown extending through the lock 10 in a releasably clamped arrangement, as will be explained. The lock 10 is comprised of two snap-assembled members, the first member being a slide cam 11. The slide cam 11 is movably mounted within a second member comprising a hooked hanger 12 which is adapted to be hooked over a boat rail, or equivalent, of a power or sail boat. The slide cam 11 and the hooked hanger 12 are separately molded, and then snap-assembled for use. For weather resistance, durability, toughness, and the avoidance of scratching chrome and other boat surfaces, a rigid plastic is preferable, such as for example, super tough nylon that is ultraviolet stable.

FIGS. 2-6 and 10 are detailed illustrations of the hooked hanger 12. FIGS. 7-9 provide detailed illustrations of the slide cam 11.

With attention directed to FIGS. 2-6, it will be seen that in FIGS. 2 and 3 opposite side views of the hooked hanger 12 are illustrated. For attachment to the railing of a boat, a hook 13 is concave downwardly open and terminates at a free end in a re-curved portion 14. At its opposite side a tangential long leg 15 extends from the hook 17 down to the bottom of the hooked hanger 12. The re-curved portion 14 is curved inwardly back toward the leg 15 to provide a snap-over fit over boat railings. The inner curvature of the rail engageable hook 13 may vary to complement different rail sizes. As evident from FIG. 1, the rope is made to pass over an outer top curved surface 16 of the hook 13 and then downwardly along backside 17 of the leg 15. Formed with the hook 13 is an upper guide hook 18 that is more clearly understood in regard to FIG. 4. The top curved surface 16 arcuately meets a back inner curved portion 19 of the upper guide hook 18 and curves back outwardly in an upper curved interior surface 20. Accordingly, the rope will be guided and bounded by curved surfaces 16, 19 and 20. From there, the rope extends along the backside 17 of the leg 15 to be guided through a channel 21 formed by standout flanges 22 and 23 which project in a direction opposite of the hook 13 from the backside 17 of the leg 15 along opposite edges thereof, as further depicted in FIGS. 4 and 6. The rope finally extends downwardly from the guide channel 21 to pass through a sidewardly open lower guide hook 24 which arcuately meets the backside 17 at a curve transition 25 that curves to meet an interior wall 26. Whereby, the rope is guided in contact with curved surfaces 17, 25 and 26 through the lower guide hook 24. The rope then extends downwardly to supportively hold a depending bumper guard, or the like, along the outside of the hull of a boat.

In order to lock the rope to the lock 10, the slide cam 11 and hooked hanger 12 are attached in an adjustable sliding relationship at the standout flanges 22 and 23. The standout flanges have opposing inclined slots 27 and 28, which in the preferred embodiment are formed to be substantially mirror images and symmetric with respect to the leg 15. The slide slots 27 and 28 are inclined at 20° to vertical in the illustrated embodiment. Along the backside 17, within the guide channel 21, there is provided a knurled or serrated, preferably patterned, frictional surface 29 against which the rope may be wedgingly clamped by the slide cam 11 for the purpose of locking the rope in a fixed position. Adjacent, but preferably spaced from the upper ends of the slide slots 27 and 28, are opposingly arranged lead-in grooves 30 and 31, respectively. The lead-in grooves 30 and 3 provide for the snap-assembly of the slide cam 11 in order to assemble the lock 10 ready for use.

With reference now to FIGS. 7-9 and continuing reference to FIG. 1, a detailed illustration of the slide cam 11 is provided. The slide cam is formed with an upper hooked end 32 facilitating ease of grasping by the user. The hooked end 32 joins in a smooth curved transition a downwardly extending flat plate 33, which terminates in a widened lobe 34 having a back flat surface 35 inclined at an angle of about 20° to the flat plate 33 in the illustrated embodiment. The opposite side of the lobe 34 comprises a serrated arcuate surface 36 which meets a curved transition 37 re-curving to tangentially meet the flat plate 33. The flat face 35 is radiused at 38 and re-curved at 39 to tangentially meet the flat plate 33. The slide cam 11 is provided to wedgingly slide within the guide channel 21 of the hooked hanger 12 in order to force the rope to be frictionally clamped between the arcuate serrated surface 36 and the knurled or serrated surface 29 on the back side 17 of the leg 15. It will therefore be understood that the slide cam 11 non-pivotally moves relative to the hooked hanger 12.

The sliding engagement of the slide cam 11 with the slide slots 30 and 31 of the standout flanges 22 and 23 is accomplished by the provision of tabs 40 and 41 which have a thickness slightly less than the width of the slots 27 and 28 whereby to be freely slidable therein. The tabs 40 and 41 are equally inclined to the flat plate 22. The engagement of the tabs 40 and 41 is made possible by means of a tapered edge configuration shown at angle A, wherein the edges of the tabs 40 and 41 taper inwardly at about a 15° angle in the preferred embodiment. This causes the tabs to have a width across the bottom substantially the same as the distance between the lead-in grooves 30 and 31, so that during assembly the tabs 40 and 41 will spread apart the standout flanges 22 and 23 until the tabs 40 and 4 snap within the slide slots 27 and 28 as shown in FIG. 1. The angle of inclination of the tabs 40 and 41 to the flat plate 33 is preferably about the same as the inclination of the slots 27 and 28 to the leg 15 to thereby dispose the flat plate 33 substantially parallel to the long leg 15. In the exemplary embodiment, the angles of inclination of both the flat surface 35 and the slots 40, 41, are 20°. This inclination causes sliding of the tabs 40, 41 in the slide slots 27 and 28 so that the serrated arcuate surface 36 moves toward the serrated portion 29 for clamping the rope therebetween. As apparent in FIG. 1, since the rope extends downwardly, any weight supported by the rope, such as a bumper guard, would draw the serrated surface 36 downward and pull the tabs 40, 41 down within the slide slots for locking the rope and disposing a bumper guard at a chosen distance from the lock 10.

The adjustment of a bumper guard is made possible by simply grasping or pushing the upper hooked end 32 and moving it upwardly to bring the serrated surface 36 out of contact with the rope. The rope then may be pulled downwardly from the lock 10 to dispose a hanger bumper at a lower position along the hull. Conversely, if it is necessary to raise the level of a bumper guard, the rope may be grasped as it emerges outwardly of the upper guide hook 13 and pulled in a direction away from the guide hook 18 which will thereby lift the serrated surface 36 upwardly from contact with the rope and move the tabs upwardly in the slots 27, 28 in order to lift a bumper guard to a higher position. Thereafter, the rope may be released and the slide cam 11 pulled downwardly to lock the rope between serrated surface 36 and serrated surface 29 to dispose a bumper guard at a higher position. The user may also push down on the hooked end 32 to clamp the rope tighter.

The rail-engageable hook 13 is easily detachable and allows for the repositioning of the lock 10 at different locations on a boat rail, or the complete removal of the lock 10 from one rail to attachment elsewhere on the craft.

In the disclosed embodiment, the lower guide hook 24 is arranged to open in the same direction as the outward opening of the upper hook 18. For, illustration, in FIG. 4 it will be seen that the hooks 18 and 24 are concave outwardly open to the right, as shown. However, the invention is not limited to this configuration and the upper and lower guide hooks may be arranged to open in opposite directions, or wherein the lower guide hook 24 might be arranged to open generally in the same direction as the guide channel 21.

The engageable hook 13 and the guide hooks 18 and 24 are provided to have arcuate interior surfaces, but other curved or flat interior surfaces may be used without leaving the scope of the invention.

While the invention has been disclosed in connection with one embodiment, it is considered that a broader range of equivalents falls within the scope of the claims appended hereto.

What is claimed is:

1. An adjustable nautical rope lock comprising:
    a hooked hanger having a downwardly open hook for engagement with a boat rail means, the hook joining a downward leg having at a side opposite the hook a pair of standout flanges formed with opposing slot means, a rope guide hook means formed with said hooked hanger above said engageable hook for guiding a rope thereabove and second guide hook means below said standout flanges for receiving a rope passed from between said standout flanges to extend therethrough, said downward leg including a serrated means therealong generally between said standout flanges; and
    slide cam means engageable with the opposing slot means of the standout flanges, said slide cam means including a plate terminating in a lower lobe portion having a serrated face and outwardly extending tab means, the tab means being slide engageable with said slot means whereby said slide cam means is slidable to move said serrated face relative to said serrated means of the hooked hanger whereby to be capable of frictionally locking a rope therebetween.

2. An adjustable nautical rope lock as claimed in claim 1 wherein said opposing slot means of the standout flanges are inclined downwardly toward said leg and wherein said tab means are inclined at substantially the same angle to the plate of the slide cam means whereby said plate is generally parallel to said leg of the hooked hanger.

3. An adjustable nautical rope lock as claimed in claim 1 wherein said first and second guides hook means are horizontally open at the same side of said hooked hanger.

4. An adjustable nautical rope lock as claimed in claim 1 wherein said hooked hanger is integrally molded.

5. An adjustable nautical rope lock as claimed in claim 4 wherein said hooked hanger is molded from nylon.

6. An adjustable nautical rope lock as claimed in claim 1 wherein said slide cam means is integrally molded.

7. An adjustable nautical rope lock as claimed in claim 5 wherein said slide cam means is molded from nylon.

8. An adjustable nautical rope lock as claimed in claim 1 wherein said slide engageable tab means taper from a wider top to a narrower bottom whereby to provide for snap engagement of the tab means with the slot means of the standout flanges.

9. An adjustable nautical rope lock as claimed in claim 1 wherein said plate has an upper end including means for grasping by a user's hand.

10. An adjustable nautical rope lock as claimed in claim 1 wherein said engageable hook includes a re-curved free end opposite the leg.

11. An adjustable nautical rope lock for boat bumpers comprising:
    two slide-engageable and integrally molded members, one member comprising a hooked hanger and the other a slide cam slidable relative to the hooked hanger whereby to wedgingly pinch a rope therebetween for the adjustable positioning of a bumper guard attached to the rope, said members being non-pivotally engaged and wherein;
    said first member comprises a triple hooked hanger having an engageable hook for engagement with a railing or the like of a boat tangentially joining a downwardly extending leg means; an upper hooked guide transversely related to said engageable hook for guiding a rope over the engageable hook and along a backside of said leg means, said leg means having a lower end; a lower hooked guide arranged at said lower end for receipt therethrough of a rope and being sidewardly open relative to said leg means; a channel means formed by two outstanding flanges extending from the backside of the leg means in a direction opposite said engageable hook, whereby a rope may pass through the channel means; said outstanding flanges including a pair of inclined slots opposingly arranged and being inclined downwardly toward said leg means;
    said second member comprises a slide cam means having a lower widened lobe means having outstanding tabs movably arranged in said slots to be movable upwardly and downwardly whereby to adjustably position the lobe means relative to said leg means, and extending plate means formed with said lobe means and extending upwardly for manual gripping by the user; and,
    serrated means located on said leg means of the triple hooked hanger and on said lobe means of the cam means adapted to clamp therebetween a rope passing through the channel means, wherein the lobe means is capable of being urged downwardly to contact the rope and whereby said rope position may be adjusted by moving the cam means upwardly to release the rope in order to reposition a bumper guard attached to the rope.

12. The adjustable nautical rope lock as claimed in claim 11 wherein the engageable hook is engageable over the railing of a boat and includes a re-curved free end capable of snapping over a tubular boat rail and wherein said hooked hanger is freely detachable at said engageable hook.

13. The adjustable nautical rope lock as claimed in claim 11 wherein the two members are each integrally molded of nylon.

14. A detachable rope lock for adjusting the locking position of nautical ropes on a boat, the rope lock comprising two integral members engaged in a non-pivotal sliding cam wedge arrangement for wedgingly gripping a rope in a desired locked position, the rope lock comprising:
    a detachable hanger member for attachment to the boat having a generally concavely open engageable hook means terminating in a downward leg; two rope guide hooks for guiding a rope over the engageable hook means and along a backside of the leg thereof, said guide hooks being sidewardly open; said leg including a channel means along said backside forming a pathway for a rope to pass therethrough; frictional engaging means arranged on said backside of said leg generally within said channel means; said channel means including slide slot means; and, a slidable cam wedge member having tab means slide engageable within said slide slot means, said tab means extending outwardly from a cam lobe means, the cam lobe means having a frictional engaging means arranged to opposingly face the back of said leg; plate means upwardly extending from said cam lobe means facilitating manual sliding of said slidable cam wedge member in said channel means to dispose said frictional engaging means thereof toward and away from said frictional engaging means of the leg of the hanger member, whereby said slidable cam wedge member is movable against a rope passed through said guide hooks and channel means whereby to frictionally wedge said rope between said respective frictional engaging means and wherein said engageable hook means is freely detachable from a boat railing means, or the like, for the repositioning of the rope lock at different locations on a boat.

15. The detachable rope lock as in claim 14 wherein the slide slot means are inclined downwardly toward said leg, whereby said slidable cam wedge member is movable along a downwardly inclined converging path toward and away from said leg for gripping and loosening the frictional wedging of a rope.

16. The detachable rope lock as claimed in claim 14 wherein said two members are integrally molded from plastic.

17. The detachable rope lock as claimed in claim 16 wherein the plastic comprises nylon.

18. The detachable rope lock as claimed in claim 14 wherein said plate means terminate in an upper free hooked end facilitating manual adjustment by one hand.

19. The detachable rope lock as claimed in claim 14 wherein said engageable hook means is downwardly concavely open and wherein said guide hooks are sidewardly open in the same direction relative to said rope lock.

20. The detachable rope lock as claimed in claim 14 wherein said hook means is downwardly concavely open and wherein said guide hooks are sidewardly open in different directions relative to said rope lock.

21. The detachable rope lock as claimed in claim 14 wherein said guide hooks have interiorly curved surfaces for smooth passage therethrough of a rope.

* * * * *